United States Patent
Haberl et al.

(10) Patent No.: US 9,333,841 B2
(45) Date of Patent: May 10, 2016

(54) DRIVE WHEEL ARRANGEMENT FOR TWO PIVOT COMPONENTS OF A TOP OF A CONVERTIBLE VEHICLE

(71) Applicant: Webasto-Edscha Cabrio GmbH, Stockdorf (DE)

(72) Inventors: Franz Haberl, Wallerfing (DE); Georg Kopp, Plattling (DE)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 0 days.

(21) Appl. No.: 14/338,648

(22) Filed: Jul. 23, 2014

(65) Prior Publication Data

US 2015/0042123 A1     Feb. 12, 2015

(30) Foreign Application Priority Data

Aug. 12, 2013   (DE) .......................... 10 2013 108 731

(51) Int. Cl.
  *B60J 7/12*       (2006.01)
  *B60J 7/057*      (2006.01)
(52) U.S. Cl.
  CPC .............. *B60J 7/1204* (2013.01); *B60J 7/0573* (2013.01); *B60J 2007/1208* (2013.01)
(58) Field of Classification Search
  CPC ...... B60J 7/1204; B60J 7/1226; B60J 7/1265; B60J 7/0573; B60J 2007/1208
  USPC ......................................... 296/112, 115, 117
  See application file for complete search history.

(56) References Cited

U.S. PATENT DOCUMENTS

| 5,671,966 A | * | 9/1997 | Busch ...................... 296/107.16 |
| 5,758,923 A | * | 6/1998 | Kolb ........................ 296/107.09 |
| 5,772,274 A | * | 6/1998 | Tokarz ..................... 296/107.09 |
| 6,834,907 B2 | | 12/2004 | Dietl |

FOREIGN PATENT DOCUMENTS

| DE | 19532567 C1 | 12/1996 |
| DE | 10159302 C1 | 11/2002 |
| DE | 10205144 A1 | 8/2003 |
| DE | 102011101972 B3 | 6/2012 |
| DE | 102011112814 A1 | 3/2013 |

OTHER PUBLICATIONS

German to English translation of DE 10 2011 112 814; retreived via PatentTranslate through Espacenet on Jun. 17, 2015; www.epo.org.*

* cited by examiner

*Primary Examiner* — Jason S Daniels
(74) *Attorney, Agent, or Firm* — Quarles & Brady LLP

(57) ABSTRACT

A top of a convertible motor vehicle includes a linkage movable between a closed position spanning a vehicle interior and a storage position uncovering the vehicle interior to the top A linkage arrangement having first and second pivot components is on opposing sides of the linkage and pivotably mounted at a rear main bearing. A rotatable drive wheel is coupled to the two pivot components. When the drive wheel is rotated, the first pivot component is always subjected to a drive torque, whereas the second pivot component, as a function of the position of a control element in a control slot that is fixed relative to the main bearing, is either held in place or is subjected to a drive torque.

11 Claims, 22 Drawing Sheets

DRIVE WHEEL ARRANGEMENT FOR TWO PIVOT COMPONENTS OF A TOP OF A CONVERTIBLE VEHICLE

CROSS REFERENCE TO RELATED APPLICATION

This application claims the priority benefit of German Patent Application No. 10 2013 108 731.0 filed on Aug. 12, 2013, which is fully incorporated herein by reference.

STATEMENT REGARDING FEDERALLY SPONSORED RESEARCH OR DEVELOPMENT

Not applicable.

FIELD OF THE INVENTION

The invention relates to a top of a convertible motor vehicle.

BACKGROUND OF THE INVENTION

Such a top of a convertible vehicle is, for example, known from document DE 10 2011 101 972 B3 and comprises a linkage, which is displaceable between a closed position, in which a top cloth is spanned by means of the linkage, and a storage position, in which the linkage is stored together with the top cloth in a rear top storage compartment and in which the vehicle interior is uncovered to the top. The linkage, in relation to a vertical longitudinal center plane of the top, comprises one linkage arrangement respectively on both sides, said linkage arrangement being pivotably mounted at a rear main bearing and including a main link which can be considered to be a first pivot component that can be pivoted with respect to the respective main bearing. Additionally, the linkage is provided with a rear tensioning bracket which constitutes a further pivot component and which, in the closed position of the linkage, limits the top cloth in the rear and spans the same in the longitudinal direction of the top. Here, the tensioning bracket rests on a top compartment cover. For driving the pivot components, the top of the convertible vehicle comprises a drive motor which drives a drive wheel arrangement that can, on the one hand, be coupled to the tensioning bracket and, on the other hand, to the main link. For coupling the drive wheel arrangement to the main link, a relative movement of the main link with respect to the main bearing is utilized. This proves to be disadvantageous since the coupling already has to be released before the final position of the linkage is reached, in order to ensure that, taking into account all the production tolerances, a decoupling is effected. Consequently, it is not possible that the top, when being closed by means of the drive, is pushed against a front apron of the respective vehicle.

Furthermore, it is known to drive a main link and a tensioning bracket of a top of a convertible vehicle by means of separate drives. Consequently, per side of the top, two drive motors with an associated gearbox unit, an associated electrical control system and the like are required. When using hydraulic cylinders as drives, all in all four hydraulic cylinders are required for actuating the main link and the tensioning bracket, with control valves and the needed accessories.

SUMMARY OF THE INVENTION

It is the object of the invention to create a top of a convertible vehicle of the generic type specified in the introduction, including a drive having a drive arrangement, being able to drive two pivot components in a defined manner.

In accordance with the invention, it is thus proposed that, in a top of a convertible vehicle having a linkage, which, in relation to a vertical longitudinal center plane of the top, comprises one linkage arrangement respectively on both sides, said linkage arrangement including two pivot components, the two pivot components can be driven by means of a drive wheel arrangement, wherein one of the pivot components is only actuated if a control element has a suitable position in a control slot that is fixed relative to a main bearing. Otherwise, said pivot component is not actuated, i.e. it is instead held in place. As a consequence, only through the corresponding position of the control element in the control slot, it is possible to determine whether only the first pivot component or both pivot components are supposed to be driven. Thus, the second pivot component is secured or released by means of the slot. Hereunto, it is not required to retrieve the position of a further top component, for example of a top compartment cover. Corresponding Bowden cables and the laying thereof can thus be omitted. The structure according to the invention can be realized through simple rotary hinges and through the control slot.

In a preferred embodiment of the top of a convertible vehicle according to the invention, the control element, which is, for example, designed as a cam, is designed at a control link which is pivotably connected to a coupling link, the pivot axis of which coincides with the axis of rotation of the drive wheel arrangement. By moving the control element in the control slot, the control link is pivotably moved, wherein, when the control element is arranged in a first portion of the control slot, a drive torque is applied onto the second pivot element from the drive wheel arrangement via the control link and the coupling link and, when the control element is arranged in a second portion of the control slot, no drive torque is applied onto the second pivot element.

Expediently, the control link is connected to the drive wheel arrangement via a drive link, which is articulated to the drive wheel arrangement, such that an actuation of the drive wheel arrangement applies a torque onto the control link, whereby it is possible, in a corresponding region of the control slot, to pivot the control link away with respect to the coupling link, without a drive torque being transmitted onto the second pivot element.

Expediently, the control link is a so-called knee link or a link having a first leg, at the free end of which the control element is designed, and a second leg, to the end of which the drive link is linked. The two legs of the control link, which preferably span an acute angle, are expediently mounted at the coupling link in their connection region.

In an expedient embodiment of the top of the convertible vehicle according to the invention, the control slot includes a first slot portion that runs, at least to a large extent, concentrically to the periphery of the drive wheel arrangement as well as a second slot portion that has an opposite-direction curvature with respect to the first slot portion, such that when the control element is arranged in the first slot portion, the drive torque can be introduced into the second pivot component from the drive wheel arrangement via the drive link, the control link and the coupling element, and, when the control element is arranged in the second slot portion, the second pivot component is stopped when the drive wheel arrangement is simultaneously driven.

In particular in a drive device which is designed as an electric motor, the drive wheel arrangements that are arranged on both sides can respectively be designed as a gear wheel, to the one face side of which the drive link for the second pivot component is linked and to the other side of which the first pivot component is linked.

In order to ensure a favorable force transmission, it is advantageous that the first pivot component is linked via a reduction gearing which is formed from a link arrangement.

Furthermore, it is advantageous if the drive arrangement that is designed in the sense of the invention is designed such that the drive wheel arrangement, when displacing the linkage from the closed position into the storage position and when displacing the linkage from the storage position into the closed position, driving is only effected in one direction of rotation respectively. This means that a change in the direction of rotation of the drive wheel arrangement does not occur during the opening process or during the closing process of the top, which simplifies activating the drive organ.

In particular, the first pivot component is a rear tensioning bracket of a foldable top, which bracket is connected to a tensioning rod arrangement to which the drive wheel arrangement is linked. The second pivot component can be a main link or main pillar of the respective linkage arrangement, the link or pillar being pivotably mounted at the main bearing.

Further advantages and advantageous configurations of the subject-matter of the invention can be taken from the description, from the drawing and from the claims.

In the drawing, one exemplary embodiment of a top of a convertible vehicle according to the invention is illustrated in a schematically simplified way and will be explained in more detail in the following description.

DETAILED DESCRIPTION OF AN EMBODIMENT

Figure 1:
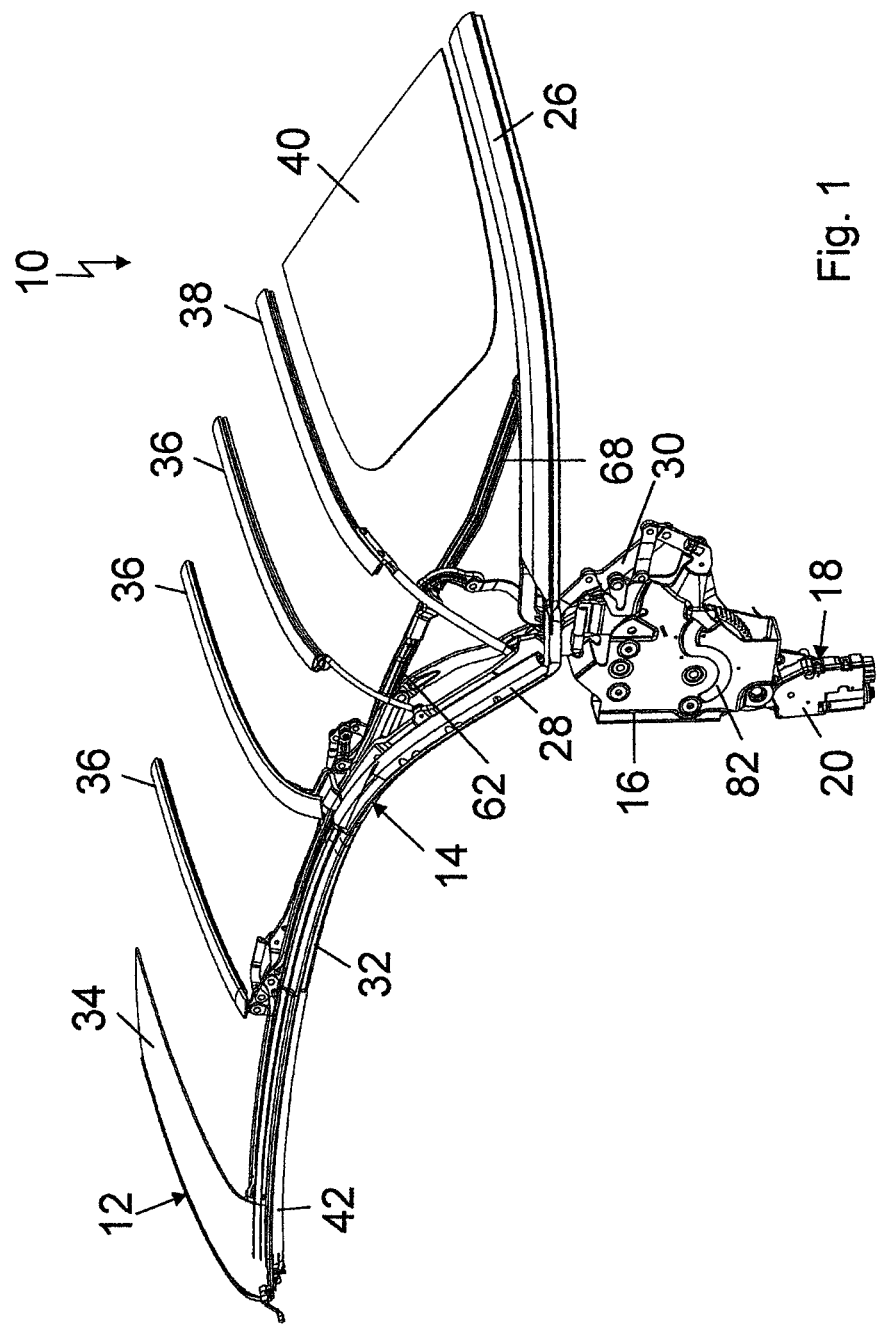
FIG. 1 shows a perspective side view of a linkage of a top of a convertible vehicle according to the invention in the closed position.
Figure 2:
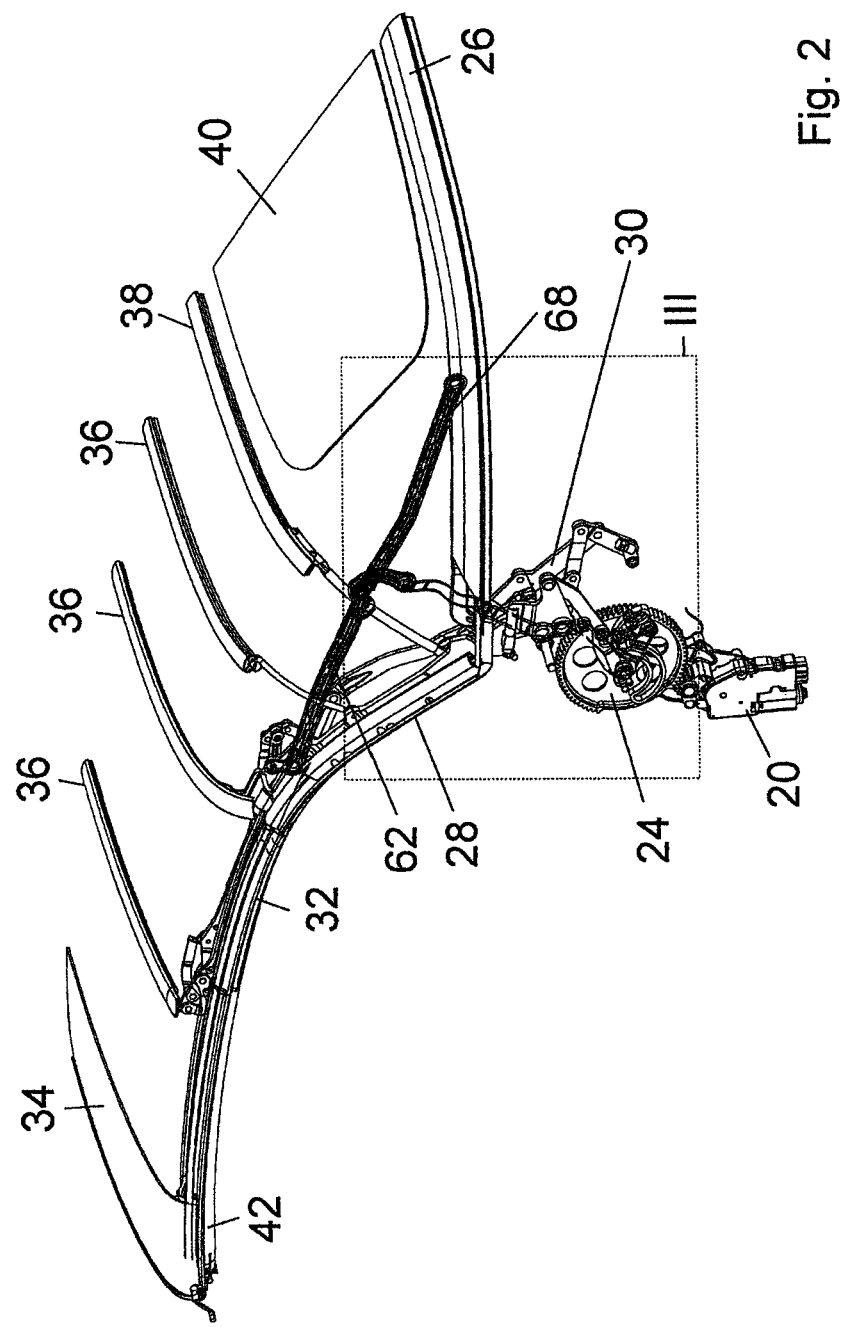
FIG. 2 shows a view of the linkage corresponding to FIG. 1, but without any main bearing.
Figure 3:
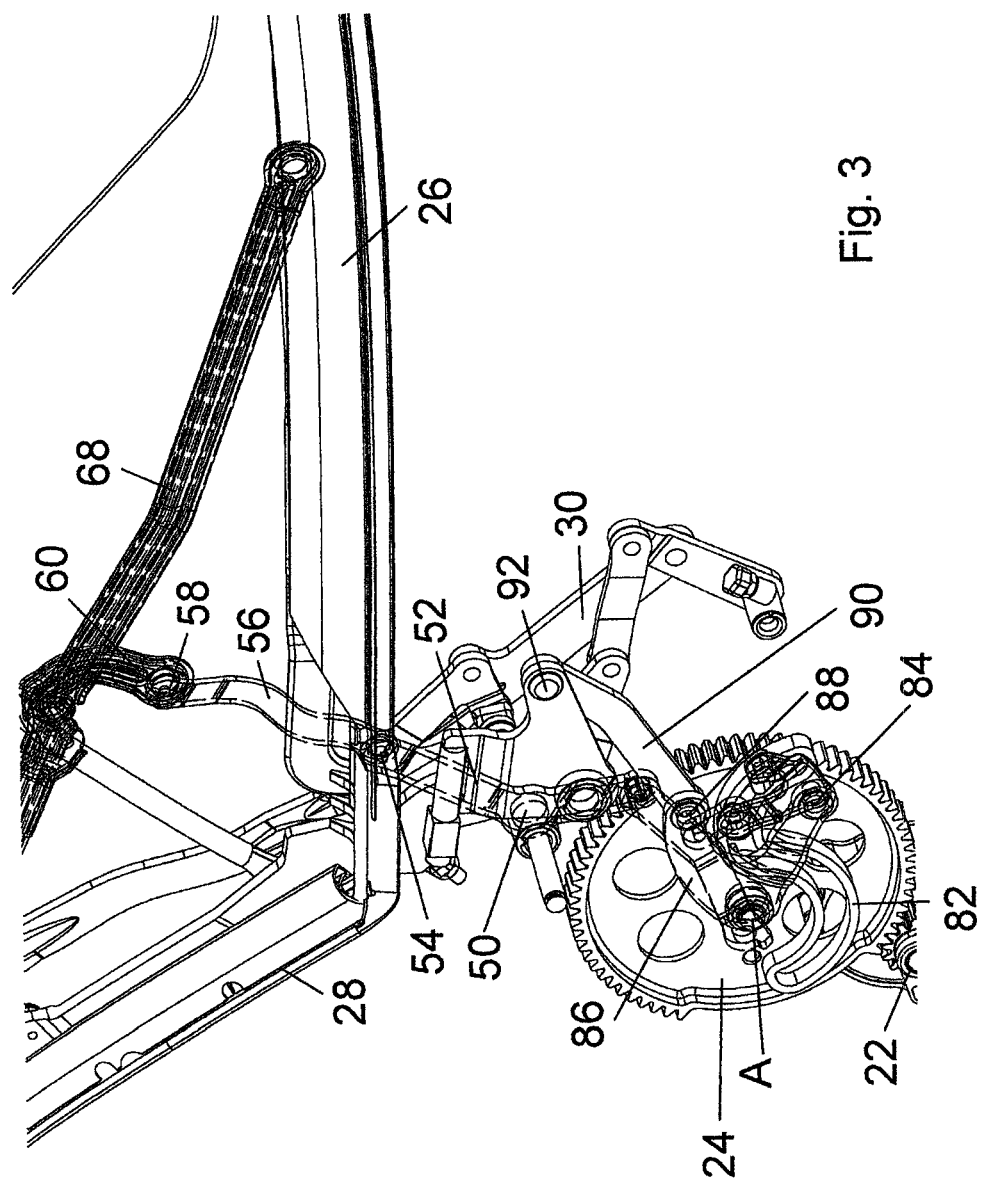
FIG. 3 shows an enlarged illustration of region III in FIG. 2.

In the drawings, a transformable roof 10 of a motor vehicle that is designed as a convertible vehicle is illustrated. The transformable roof 10, which thus forms a top of a convertible vehicle, comprises a linkage 12, which serves to span a top cloth which is formed from a flexible foldable material and which is not illustrated in more detail. Hereunto, the linkage 12 is displaceable in a closed position illustrated in FIGS. 1 to 6 and spanning a vehicle interior of the respective vehicle and in a storage position illustrated in FIGS. 19 to 22 and uncovering the vehicle interior to the top, in which storage position the linkage is stored in a rear top storage compartment of the vehicle. The top storage compartment can be closed by means of a top compartment cover, which is not illustrated in more detail here.

In relation to the vertical longitudinal center plane of the top, the linkage 12 includes one linkage arrangement 14 respectively on both sides, said linkage arrangement being pivotably mounted at a main bearing 16 that is fixed relative to the vehicle.

The linkage 12, in relation to a vertical longitudinal center plane of the top, is designed in a mirror-symmetrical manner at least to a large extent. Therefore, the following description, for reasons of clarity, is substantially only effected with the aid of the linkage arrangement which is arranged on the left with respect to the forward direction of travel of the respective vehicle. This description can directly be applied to the linkage arrangement which is arranged on the right with respect to the forward direction of travel.

In the region of the main bearing 16, a drive unit 18 is arranged which comprises a drive motor 20 that is designed as an electric motor and that constitutes a drive device. Said drive motor 20, via a drive pinion 22, drives a drive wheel 24 which is designed as a gear wheel, and which constitutes a drive wheel arrangement and by means of which a rear tensioning bracket 26 can be driven. Said tensioning bracket 26 limits the top cloth in the closed position of the roof 10 at the rear edge thereof and rests on the top compartment cover. Furthermore, the drive wheel 24, for pivoting the linkage arrangement 14, can drive a first main link 28 which forms a multiple-arm hinge mechanism together with a second main link 30 and an intermediate link 32 forming a central frame element.

The tensioning bracket 26, in the closed position of the roof 10, extends at the rear edge thereof, between the linkage arrangements 14 which are arranged on both sides. Additionally, the two linkage arrangements 14 are connected to each other via a front bow 34, three intermediate bows 36 and a so-called corner bow 38. In a region which is arranged between the corner bow 38 and the rear tensioning bracket 26, the top cloth accommodates a transparent rear window 40, the bearing of which at the linkage 12 is not described in more detail in the present case. The two linkage arrangements 14 further respectively include one link 42 which is arranged in the front in the closed position, and which forms a front frame element. Said frame element is adjacent to a front apron of the respective vehicle, which apron is not illustrated in more detail here, and the front bow 34 is mounted at the frame element.

Figure 4:
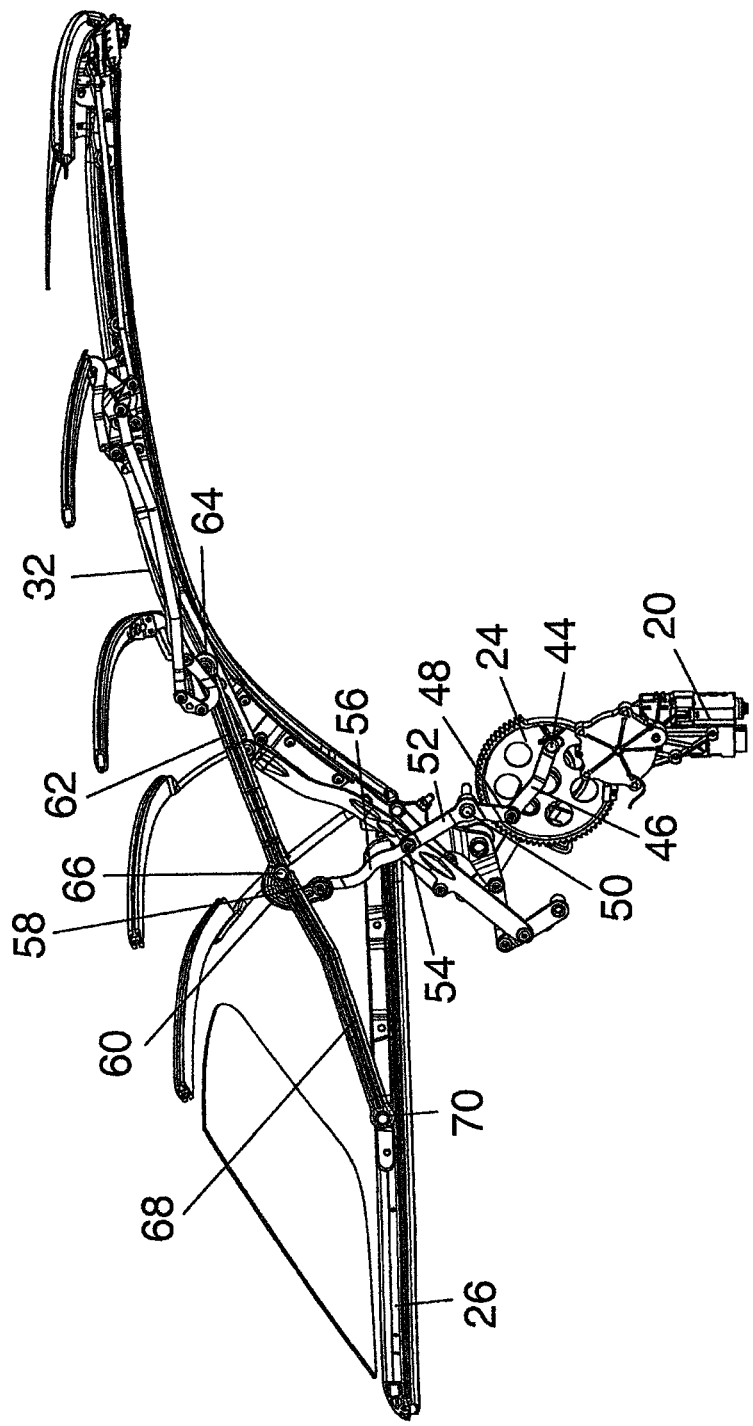
FIG. 4 shows an inside view of the linkage according to FIG. 1 from the point of view of a vertical longitudinal center plane of the top.
Figure 5:
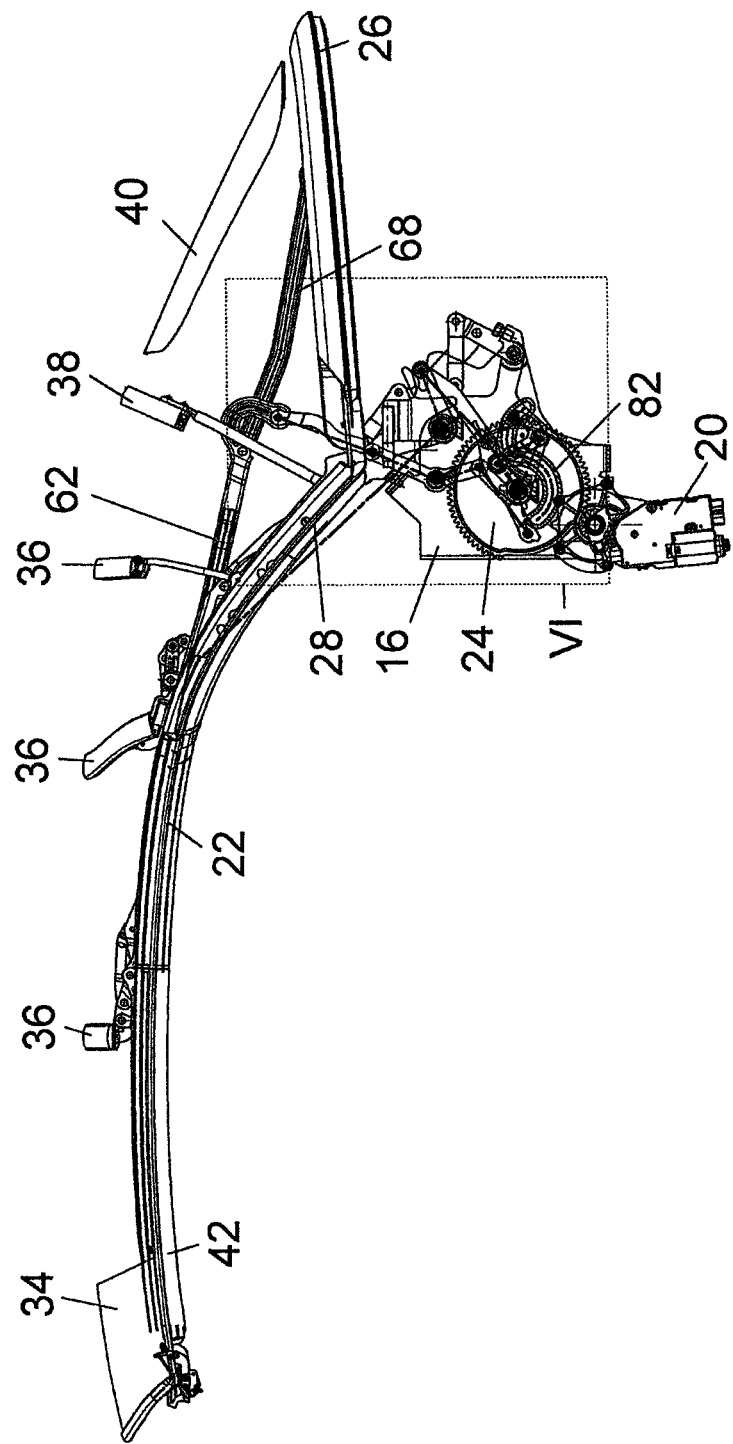
FIG. 5 shows a further side view of the linkage according to FIG. 1 in the closed position thereof.

For driving the tensioning bracket 26, i.e. for lifting and lowering the same, at the side of the drive wheel 24 facing the longitudinal center plane of the top, a drive link 46 is articulated via a hinge 44. Said drive link, via a hinge 48, is connected to a knee link 52 which is mounted at the main bearing via a pivot axis 50, and which is in turn connected to a coupling link 56 via a hinge 54, said coupling link, via a hinge 58, being connected to an extension 60 of a front tensioning rod 62. Said front tensioning rod 62, via a hinge 64, is connected to the intermediate link 32 with its front end and, via a hinge 66, is connected to a rear tensioning rod 68 (cf. in particular FIG. 4). The rear tensioning rod 68 is articulated to the rear tensioning bracket 26 via a hinge 70. Starting from the position that is illustrated in FIG. 4, through a counterclockwise actuation of the drive wheel 24, via a reduction gearing which is formed from the drive link 46, the knee link 52 and the coupling link 56, a tractive force that is directed downwards is introduced into the tensioning rod arrangement that is formed from the tensioning rods 62 and 68, whereby the tensioning bracket 26 which is pivotably mounted at the main bearing 16 is lifted. Consequently, the rear top storage compartment cover can be opened.

For driving the main pillar 28, at the side of the drive wheel 24 facing away from the vertical longitudinal center plane of the top, a further drive link 74 is articulated via a hinge 72, the drive link, with its end facing away from the hinge 72, via a hinge 76, being articulated to a free end of a first leg of a control link 78 that is designed as a triangular control arm or as a knee link. A second leg of the control link 78, at its free end, includes a cam-like control element 80 which is guided in a control slot 82. In a connection region of the two legs, the control link 78, via a hinge 84, is connected to a coupling link 86 which is also designed as a knee link, and which can be pivoted about an axis A, the axis coinciding with the axis of rotation of the drive wheel 24. The coupling link 86, via a hinge 88, is in turn connected to a link 90 which, via a further hinge 92, is linked to the main pillar 28 or to a structural element that is rigidly connected to the main pillar 28.

The control slot 82, which, as it can be taken from FIG. 1, is designed at the main bearing 16, includes a first slot portion X that is designed so as to be curved and runs concentrically to the periphery of the drive wheel 24 about the axis A of rotation thereof. The slot portion X extends over a region of approximately 160° to 180°. A second slot portion Y adjoins the slot portion X, which portion Y also has a curved profile that extends in the opposite direction of the profile of the slot portion X. In the broadest sense, the slot portion Y, in relation to the axis A, runs in a radial profile and has a curvature.

The afore-described linkage 12 functions in the manner which is described in the following.

Figure 6:
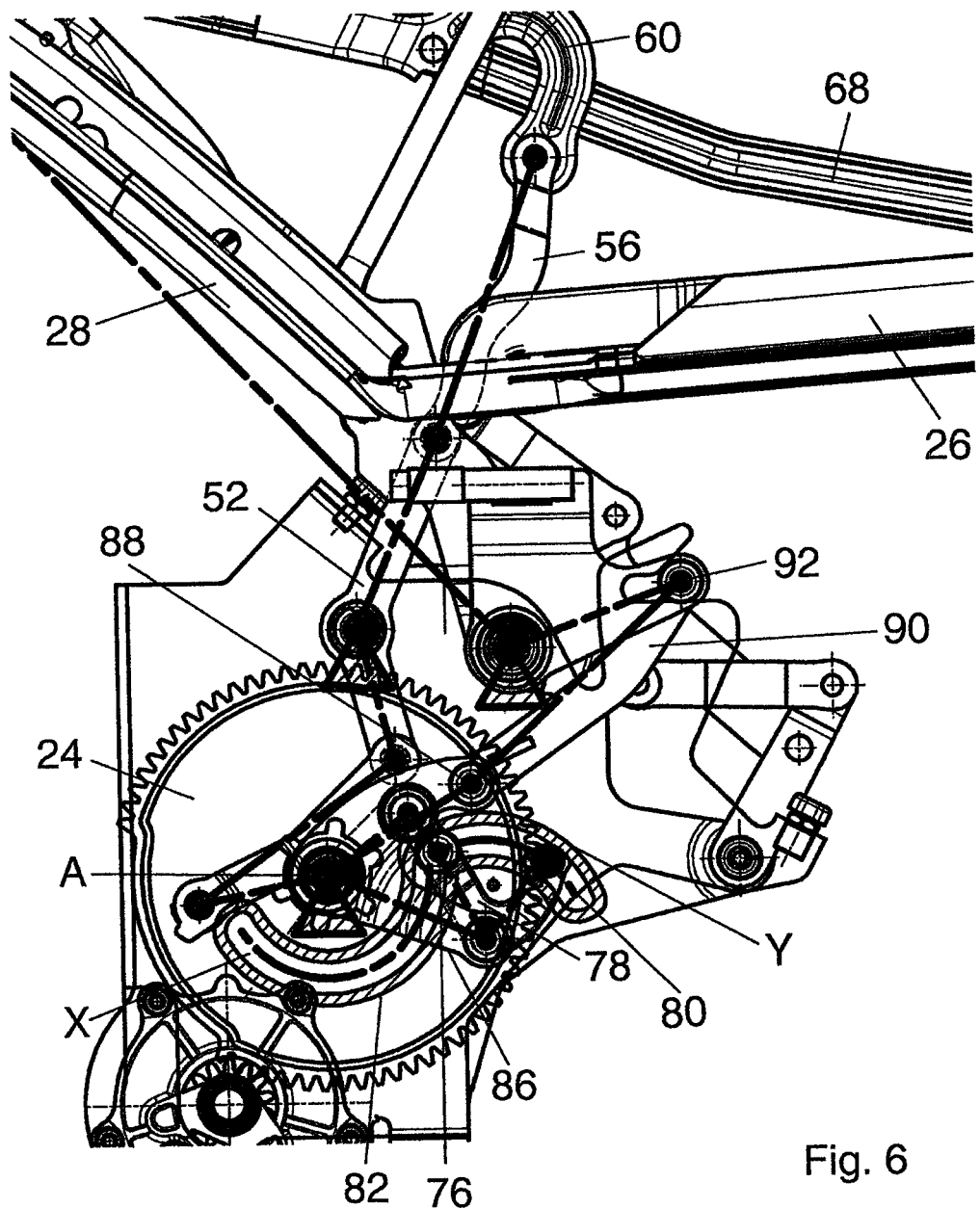
FIG. 6 shows an enlarged illustration of region VI in FIG. 5.
Figure 7:
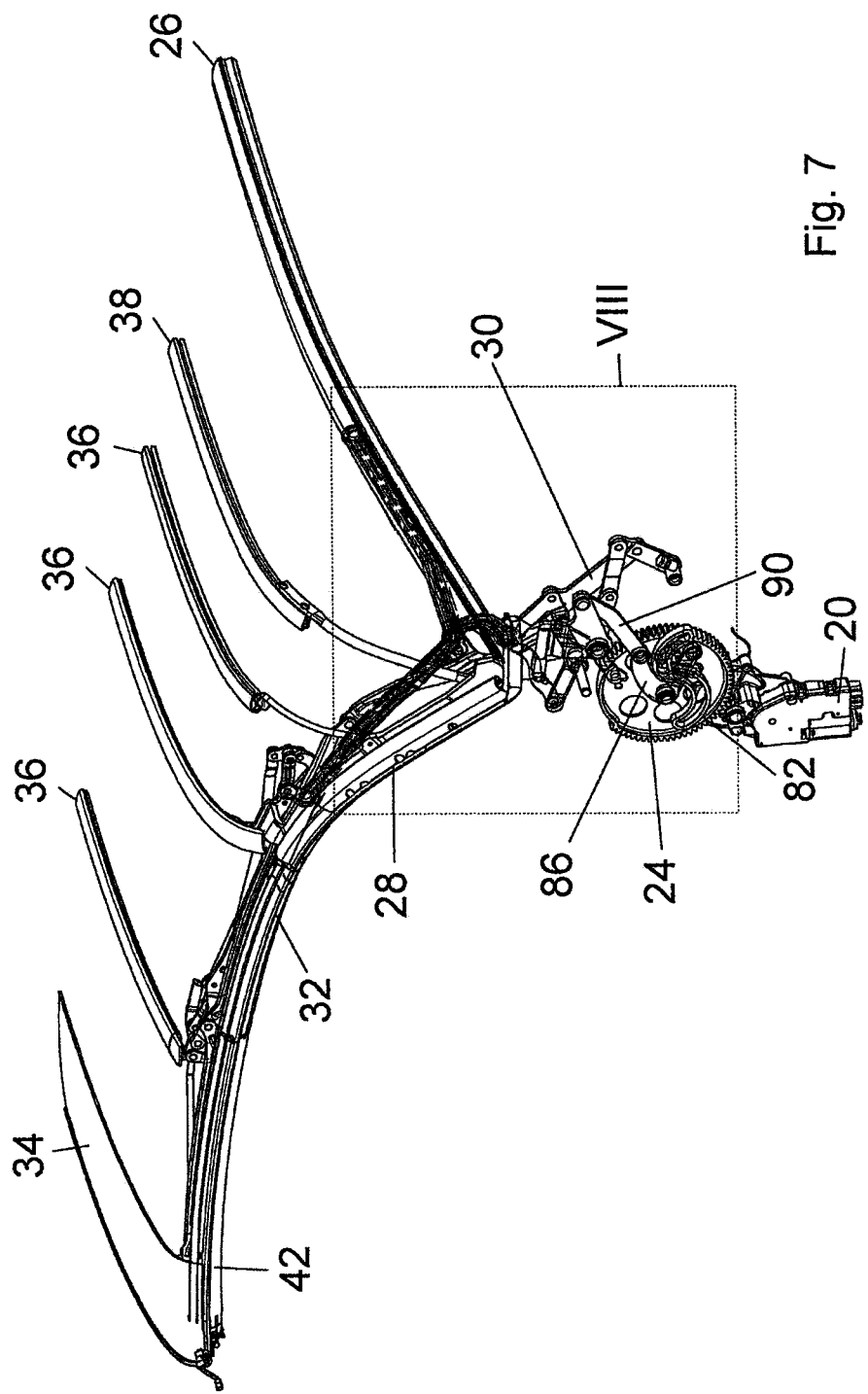
FIG. 7 shows a view of the linkage corresponding to FIG. 2, but with a rear tensioning bracket which is partially lifted.
Figure 8:
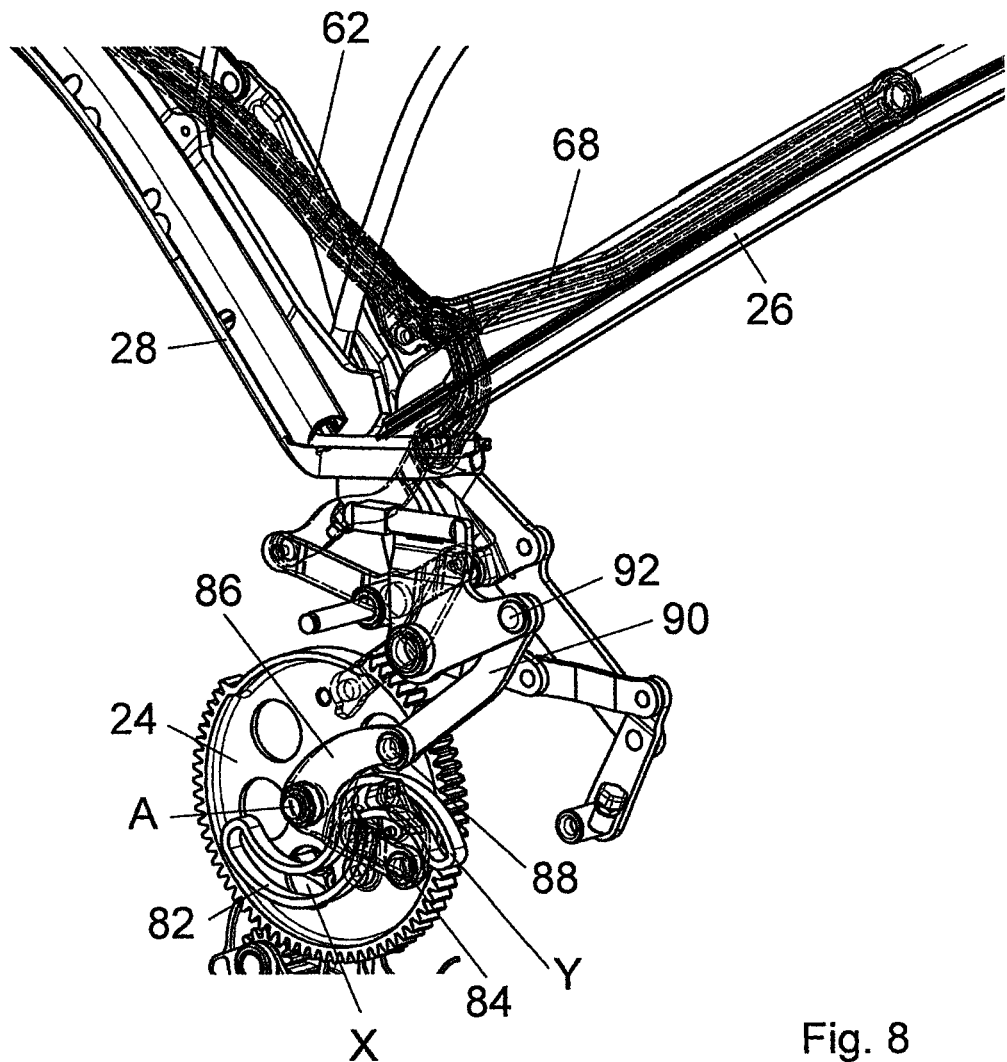
FIG. 8 shows an enlarged illustration of region VIII in FIG. 7.
Figure 9:
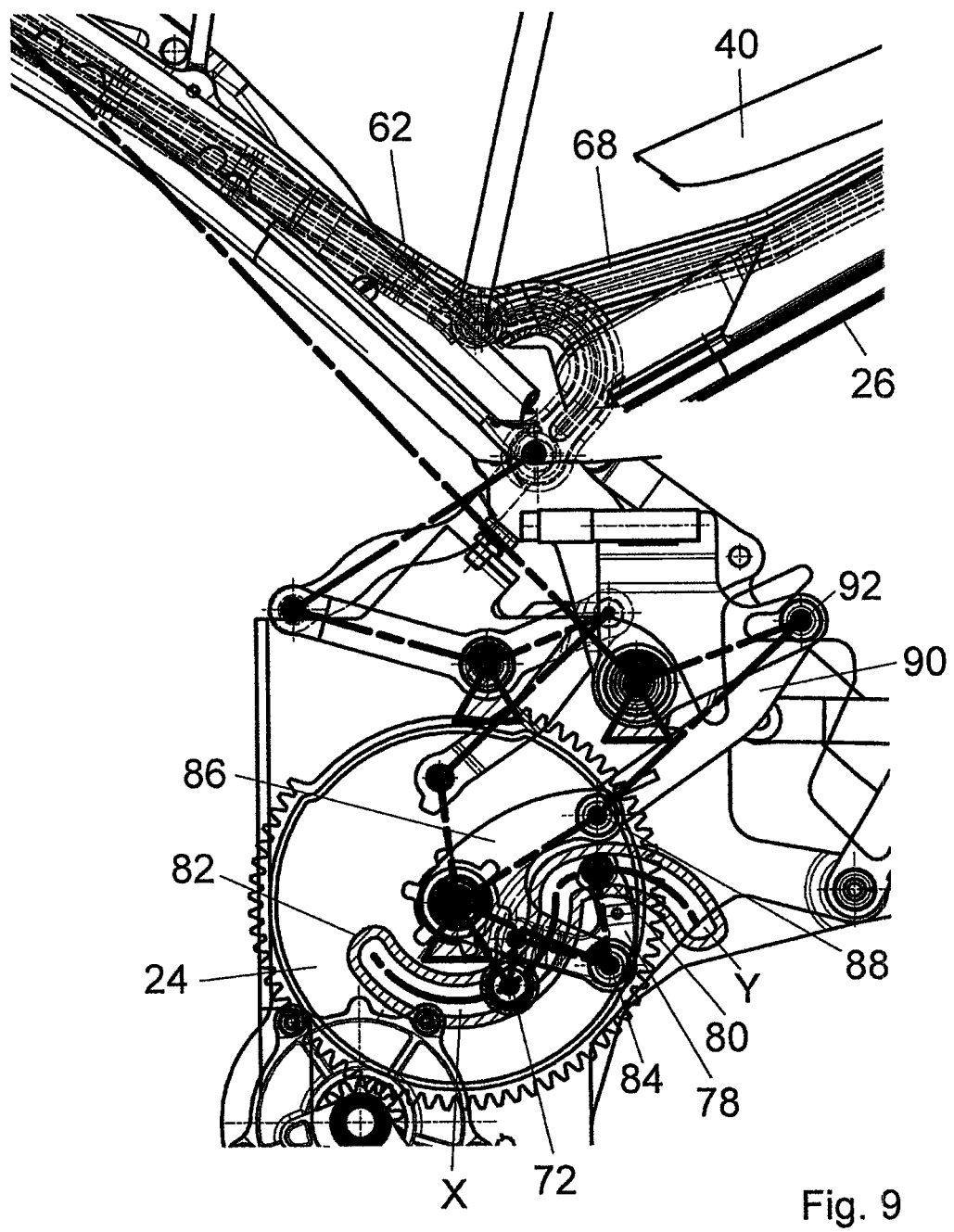
FIG. 9 shows a side view of the drive region of the linkage that is illustrated in FIG. 8, with a tensioning bracket which is partially lifted.
Figure 10:
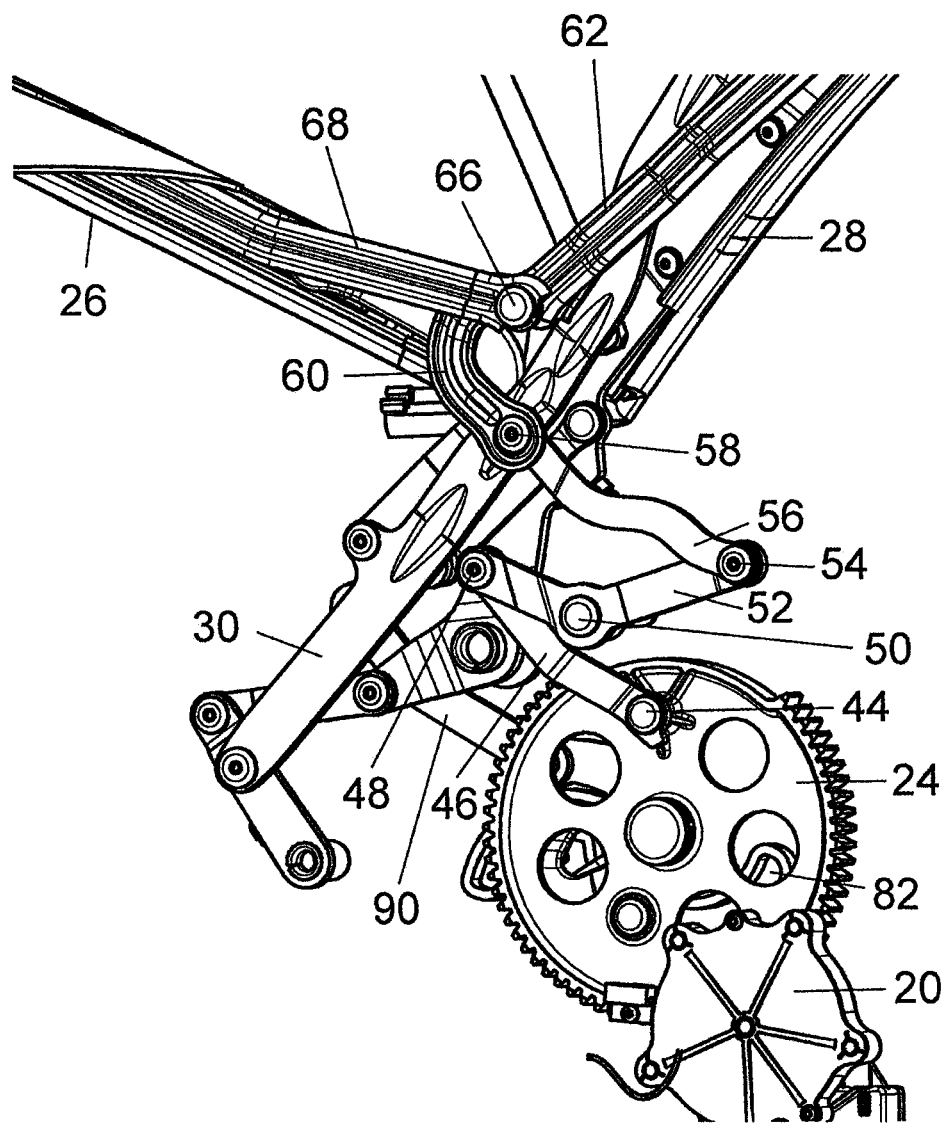
FIG. 10 shows an inside view of the drive region with a tensioning bracket which is partially lifted.
Figure 11:
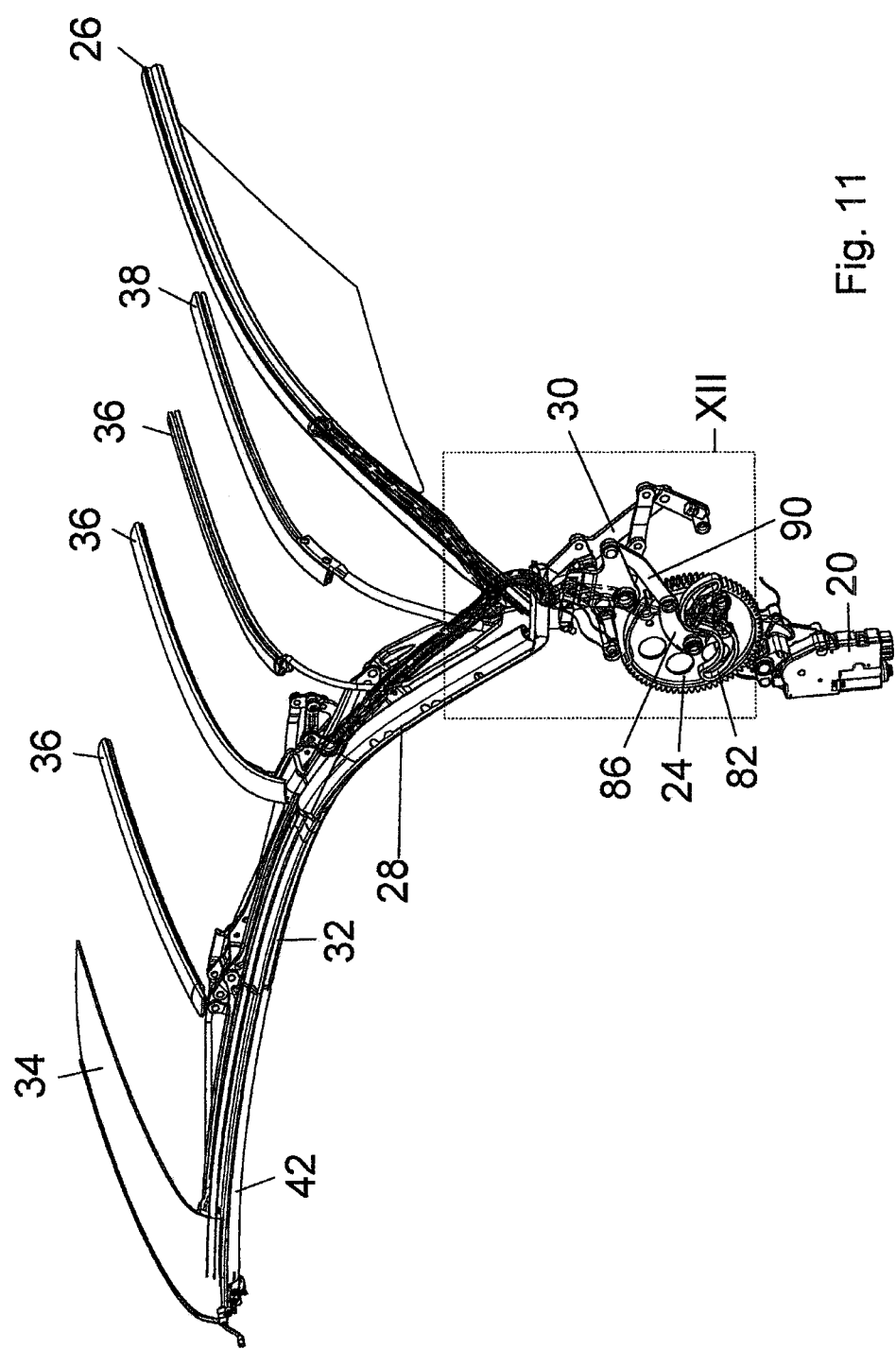
FIG. 11 shows a view of the linkage corresponding to FIG. 2, but with a tensioning bracket which is fully lifted.

Starting from the closed position which is illustrated in FIG. 1, the drive wheel 24 is rotated through an actuation of the drive motor 20, wherein, in the illustration shown in FIG. 6, the rotation is clockwise. Here, as already described above, via the drive link 46, the knee link 52 and the coupling link 56 and the tensioning rods 62 and 68, the rear tensioning bracket 26 is lifted which is coupled to the drive wheel 24 over the entire drive path. Simultaneously, the control link 78 which is pivotably mounted at the coupling link 86 is pivoted, through the drive link 74 that is arranged at the outer side of the drive wheel 24, such that the control element 80 that is designed at the control link 78, in the illustration shown in FIG. 6, is moved, counterclockwise, in the slot portion of the control slot 82 that is fixed relative to the main bearing up to the transition into the slot portion X. Consequently, no drive torque is introduced into the coupling link 86 nor, consequently, into the main pillar 28 constituting a pivot element. The coupling link 86 and the downstream link 90 are instead freely pivoted with respect to the drive wheel 24. A movement of the main pillar 28 is also prevented through a force introduced from the outside, due to wind, a road with many potholes or the like. The main pillar 28 instead remains in its position which is associated with the closed position of the top, such that the vehicle interior is continuously spanned by the linkage or by the top cloth. The drive motor 20 and, consequently, the drive wheel 24 are stopped now, such that the top compartment cover can be opened.

Figure 12:
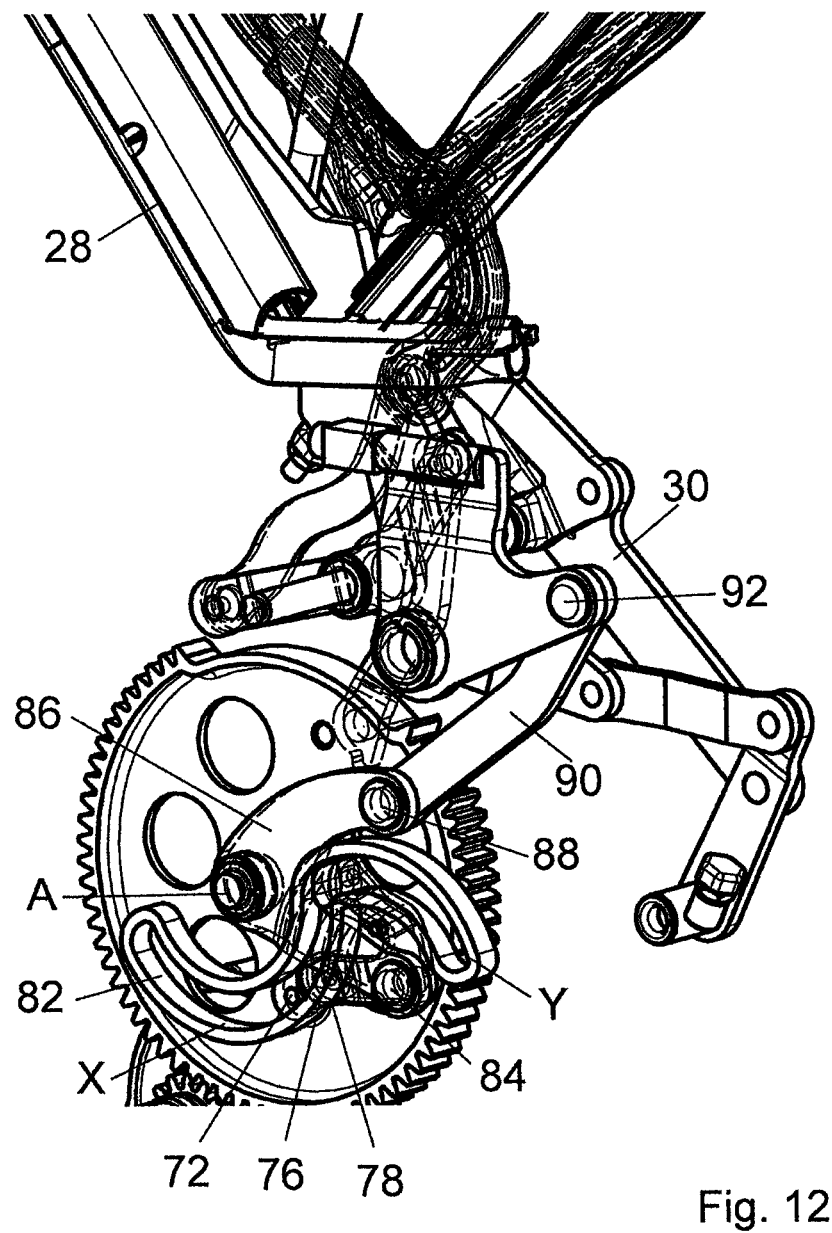
FIG. 12 shows an enlarged illustration of region XII in FIG. 11.
Figure 13:
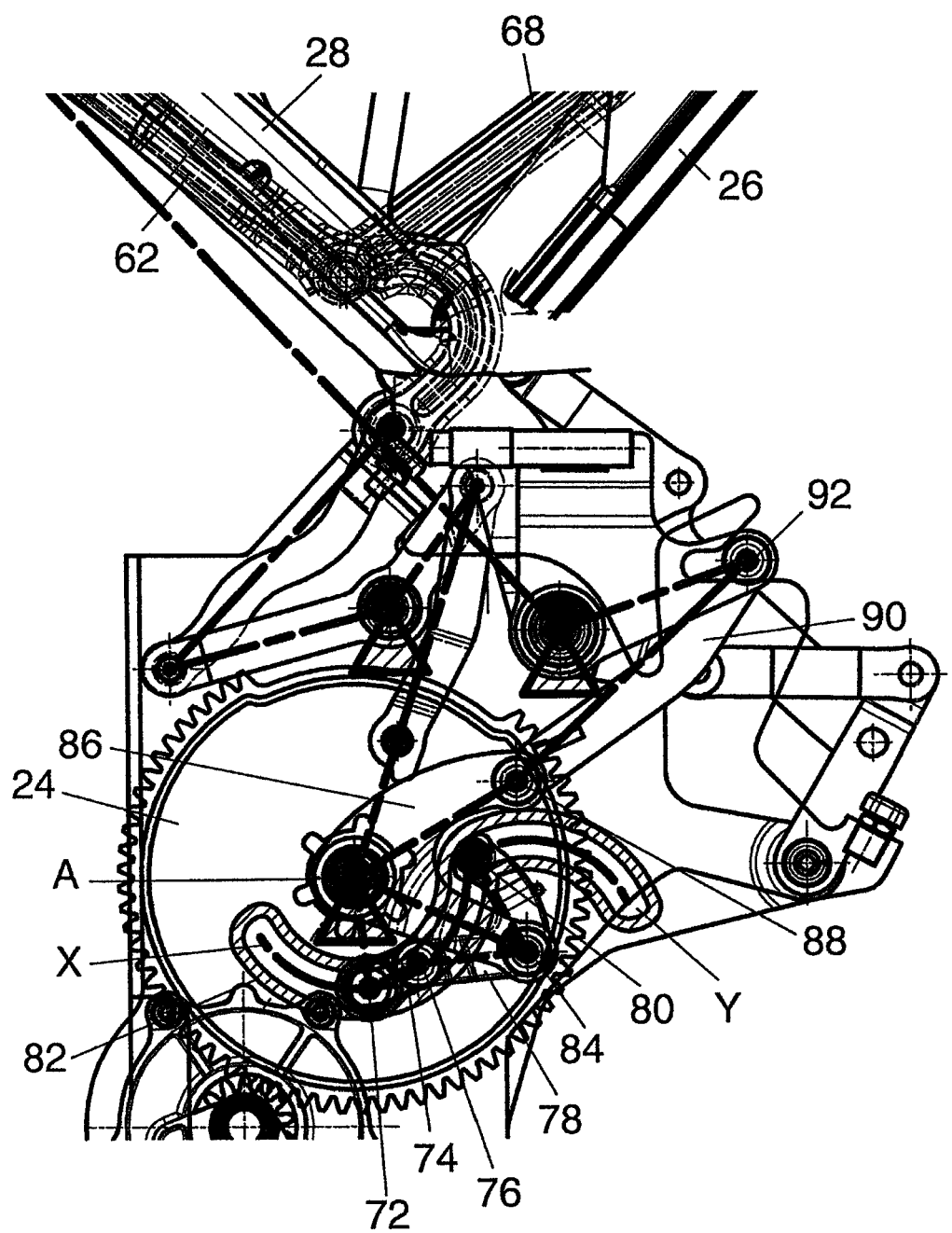
FIG. 13 shows a side view of the drive region as a top view in the tensioning bracket position which is fully lifted.
Figure 14:
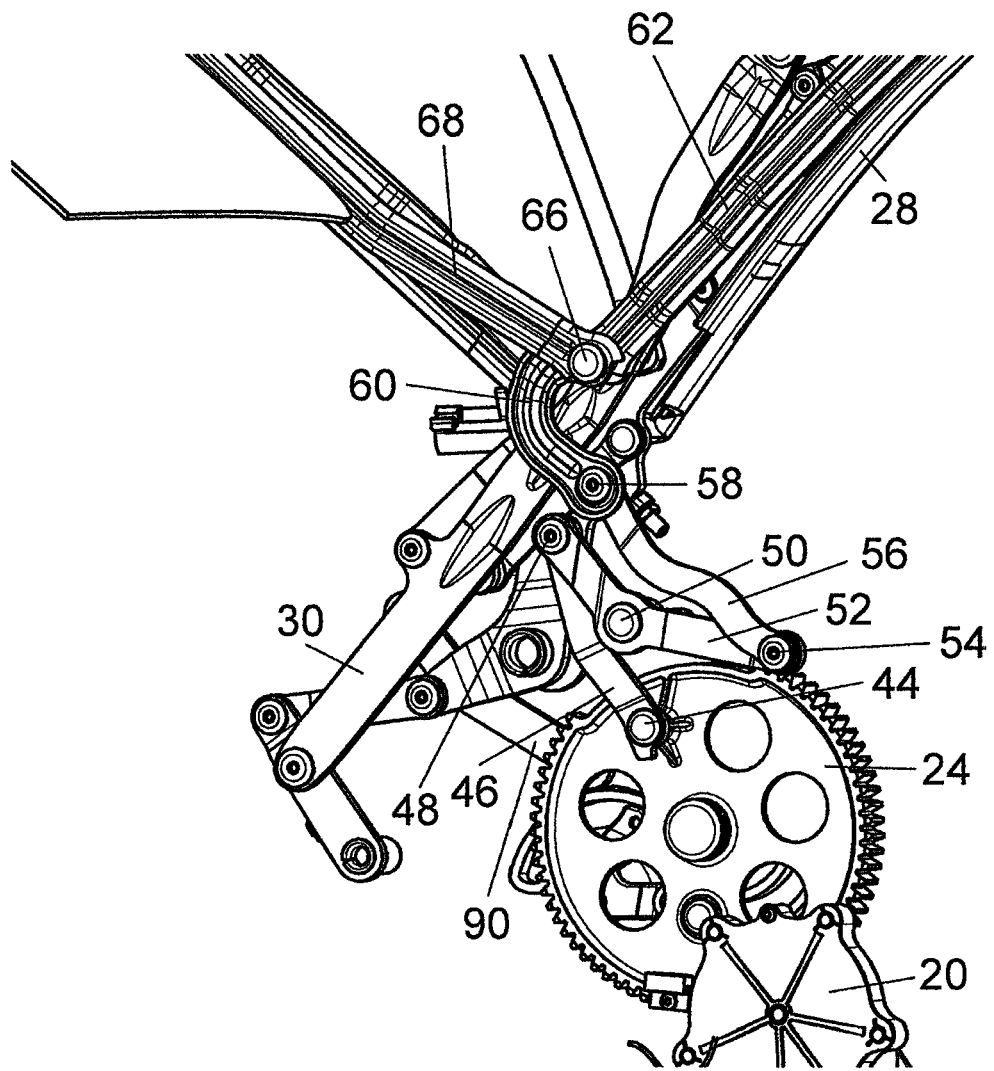
FIG. 14 shows an inside view of the drive region of the linkage with a tensioning bracket which is fully lifted.
Figure 15:
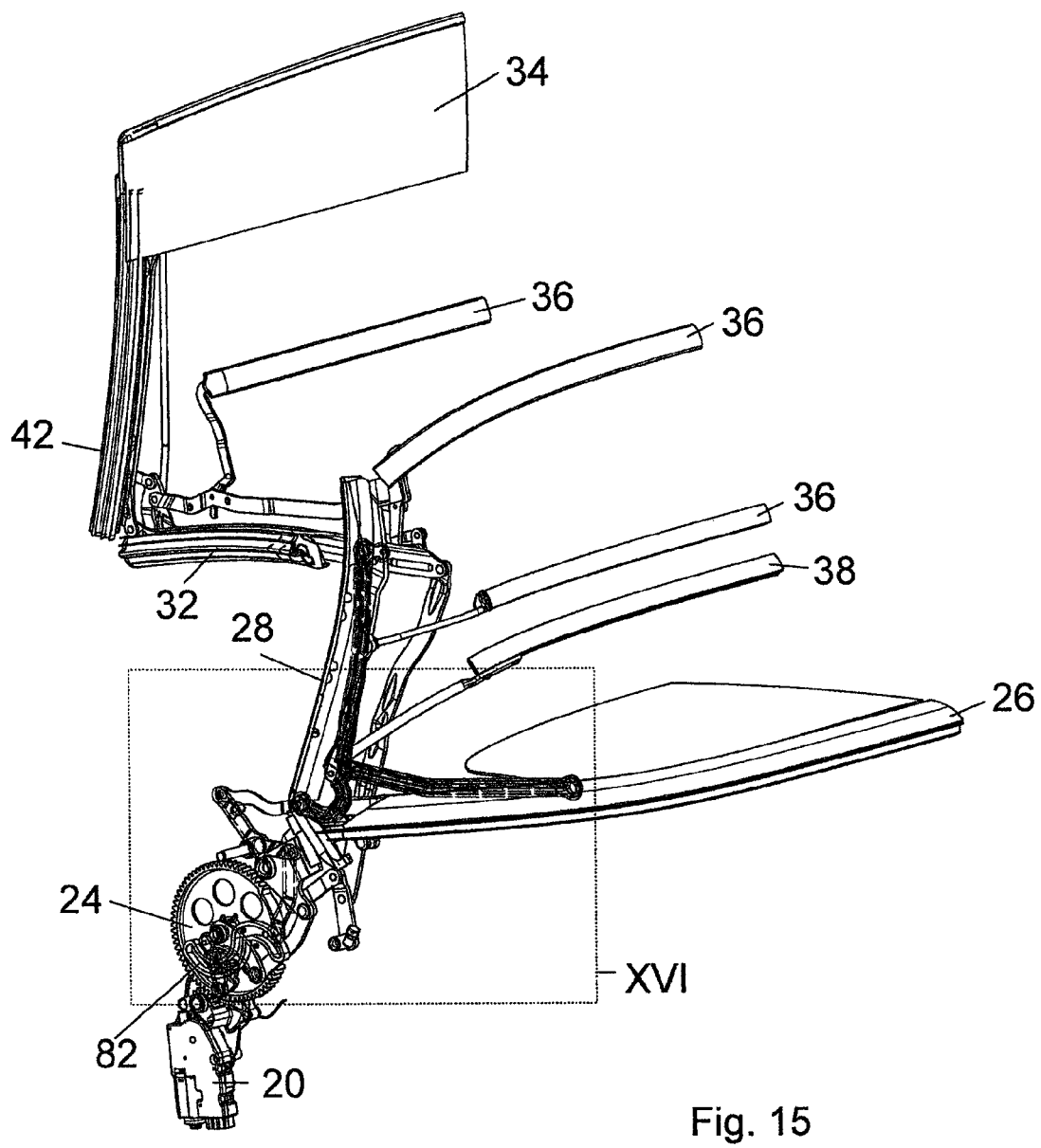
FIG. 15 shows a view of the linkage corresponding to FIG. 2 in an intermediate position during displacement between the closed position and a storage position.
Figure 16:
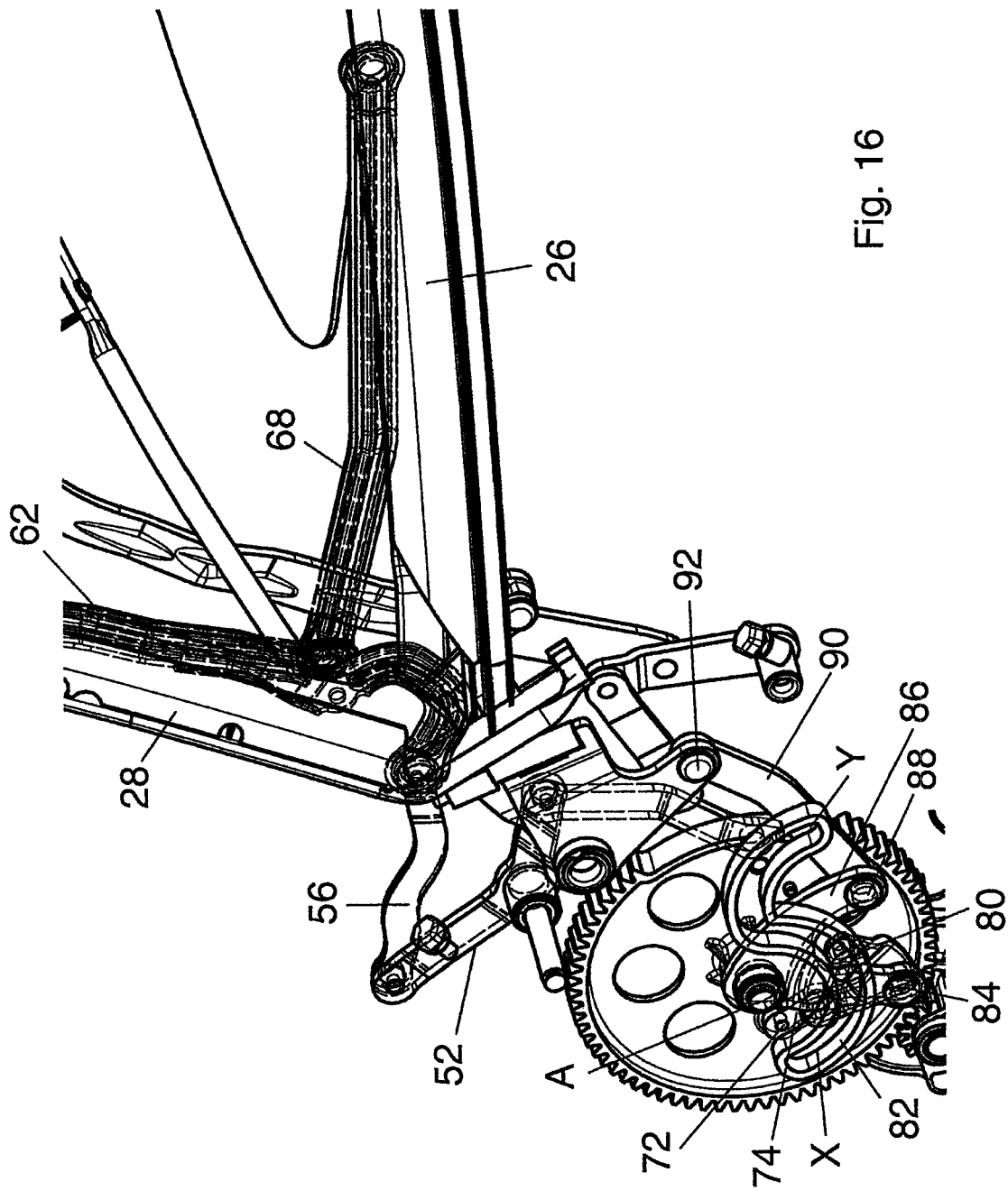
FIG. 16 shows an enlarged illustration of region XVI in FIG. 15.
Figure 17:
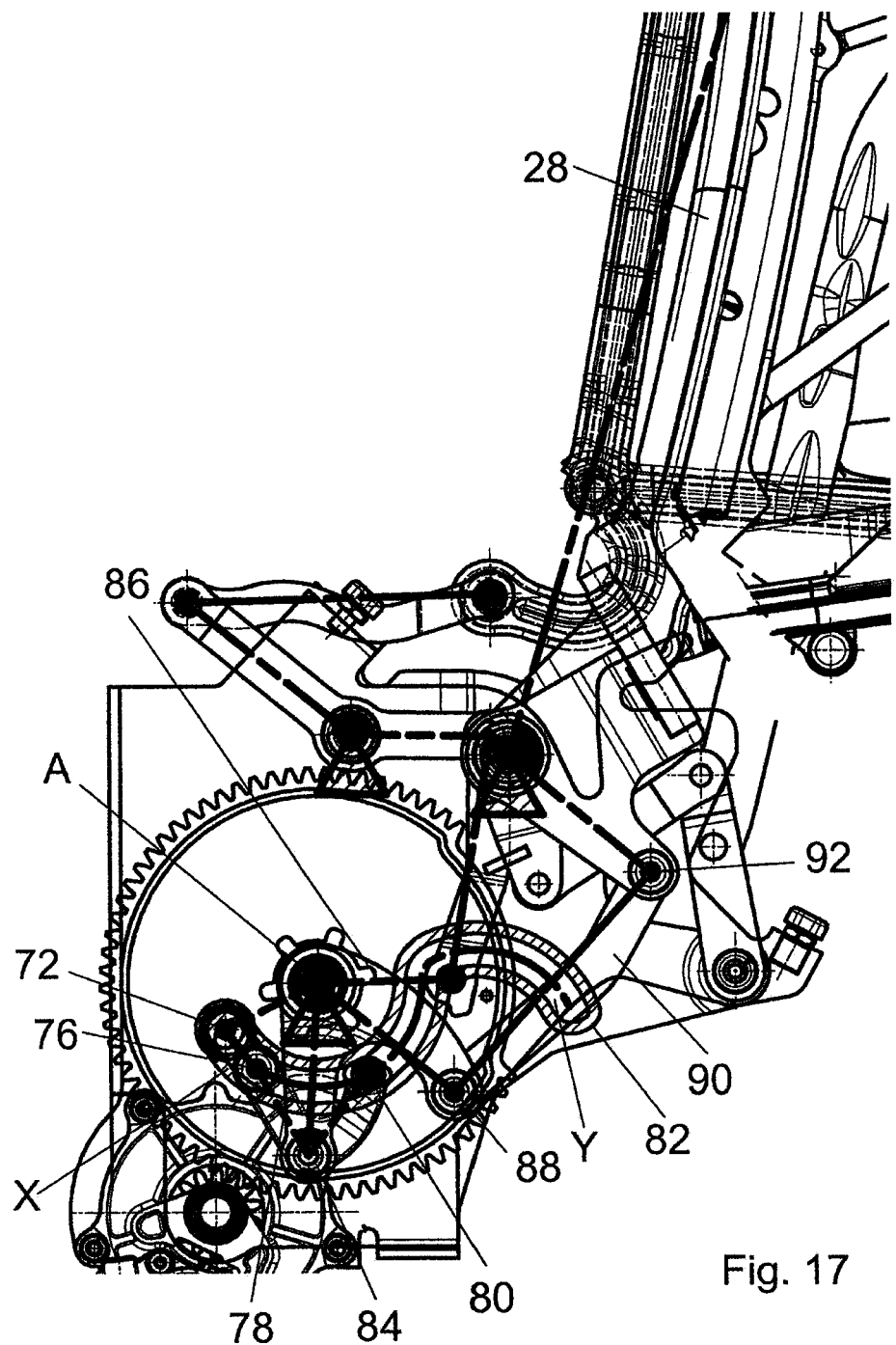
FIG. 17 shows a side view of the drive region of the linkage in an intermediate position as a top view.
Figure 18:
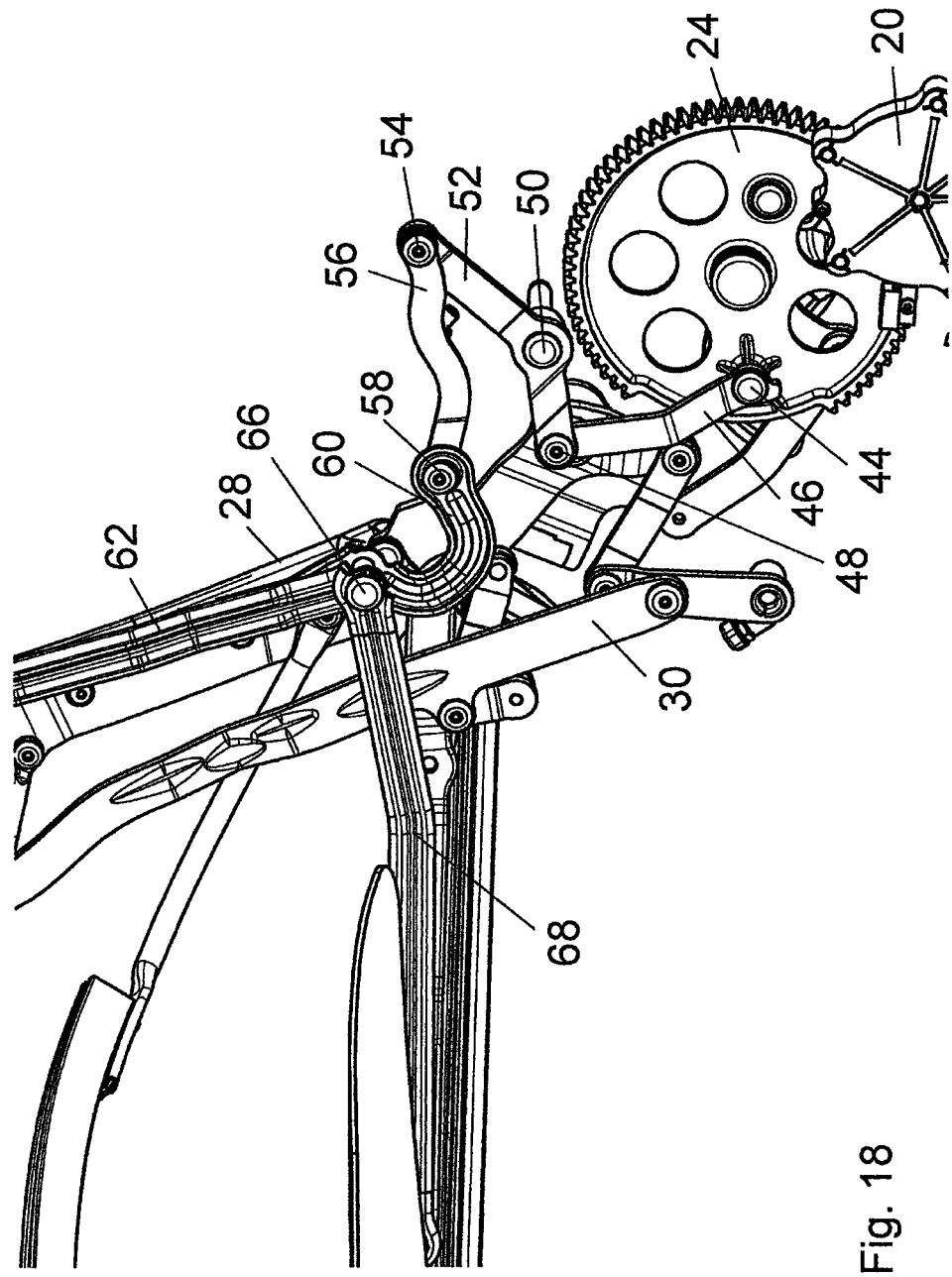
FIG. 18 shows an inside view of the drive region in the intermediate position.
Figure 19:
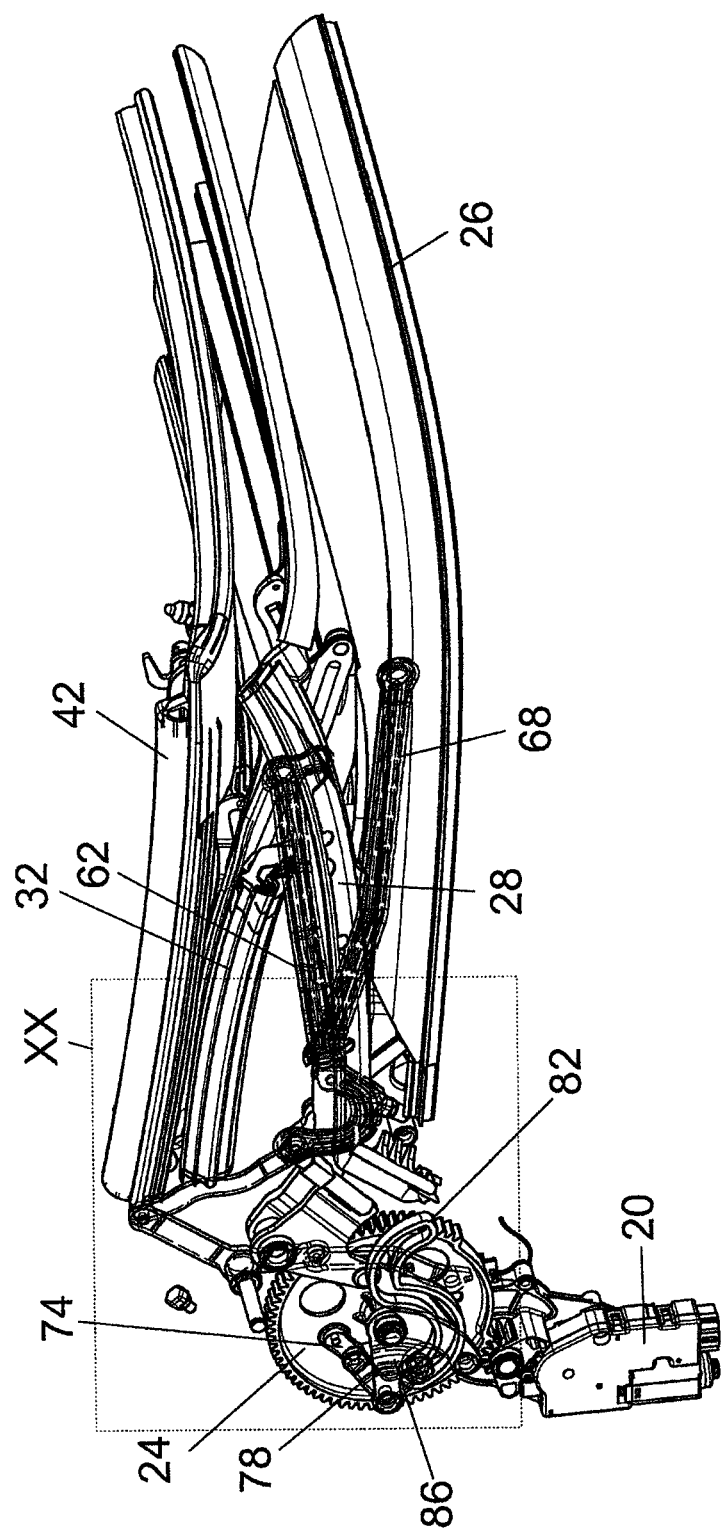
FIG. 19 shows a view of the linkage corresponding to FIG. 2 in the storage position thereof.
Figure 20:
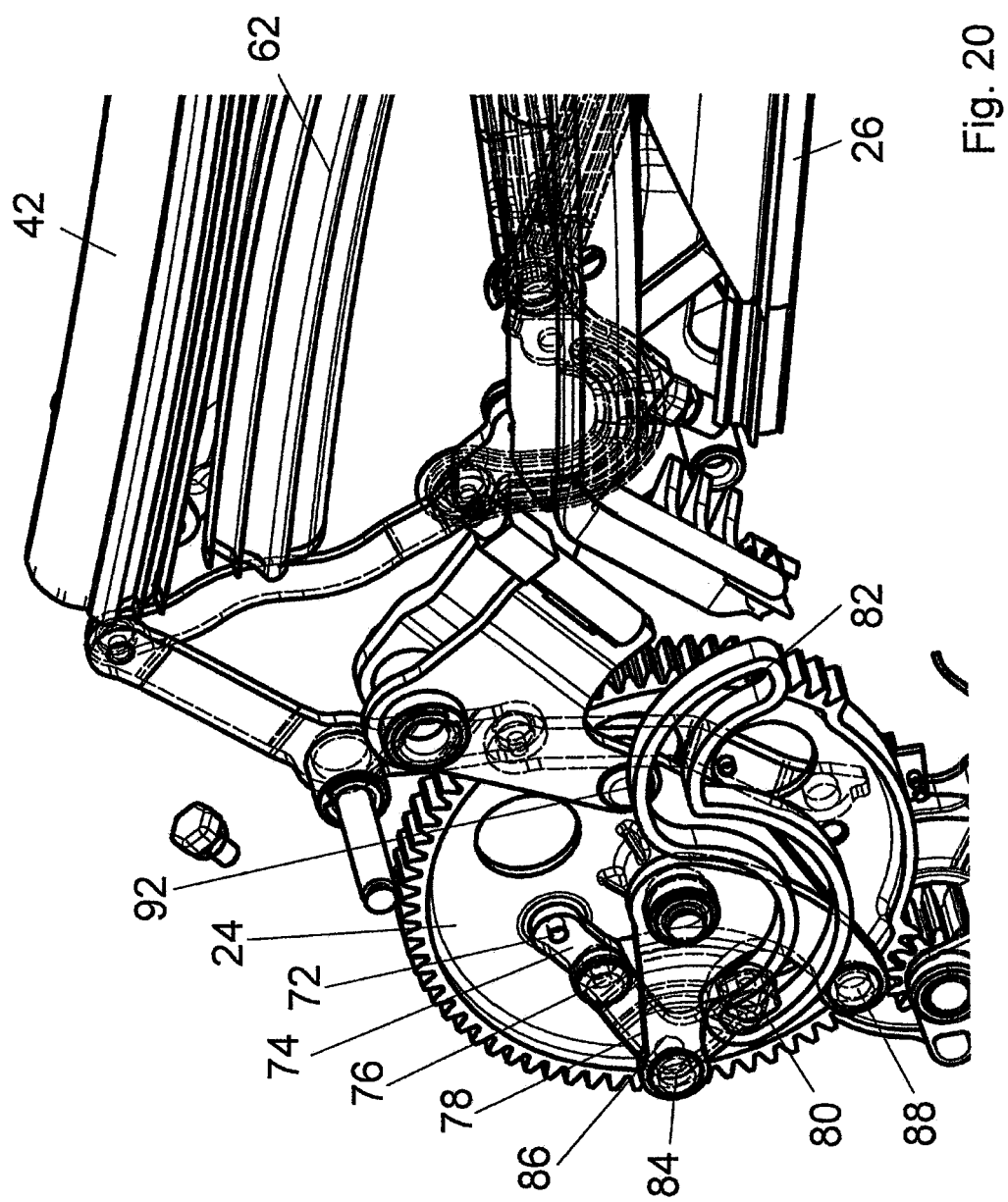
FIG. 20 shows an enlarged illustration of region XX in FIG. 19.
Figure 21:
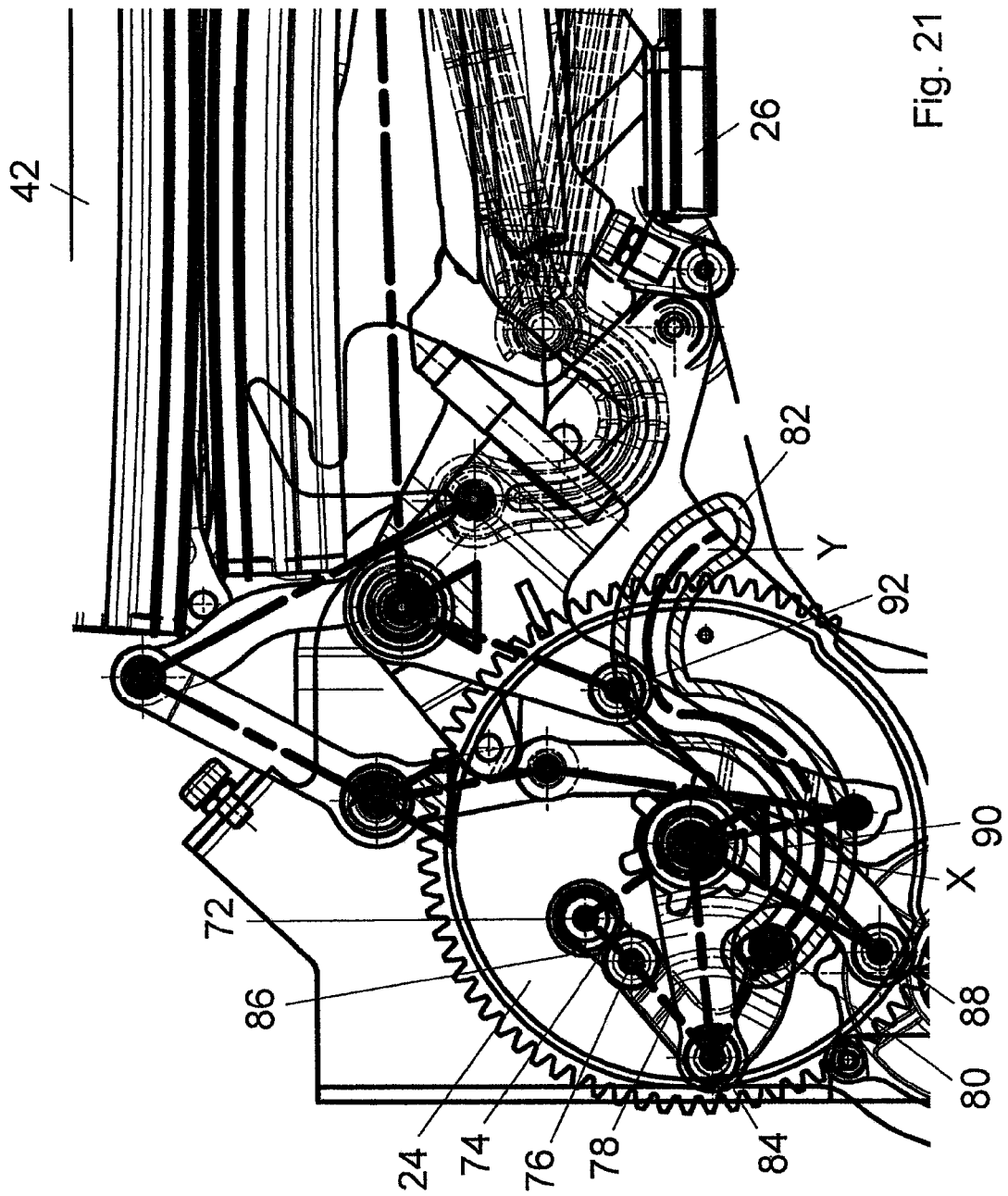
FIG. 21 shows a side view of the drive region in the storage position of the linkage
Figure 22:
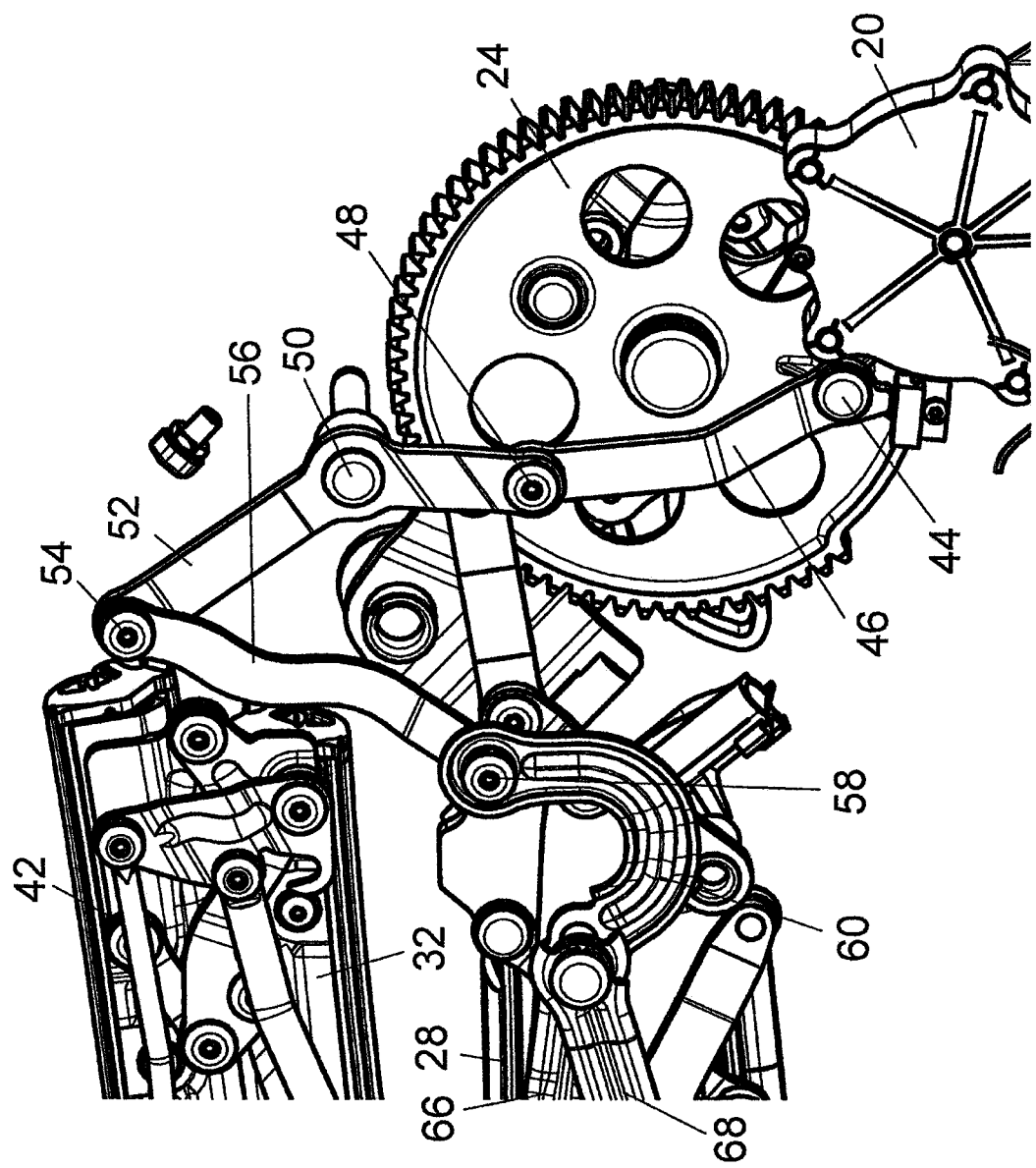
FIG. 22 shows an inside view of the drive region of the linkage in the storage position thereof.

Starting from the lifted position of the tensioning bracket 26, which is illustrated in FIGS. 12 to 14, the drive wheel 24 is continuously rotated now by means of the drive motor 20 and with the same direction of rotation, i.e. clockwise in relation to FIG. 6. Consequently, the tensioning bracket 26 is lowered again via the drive link 46, the knee link 52, the coupling link 56 and the tensioning rods 62 and 68. Simultaneously, the control link 78 is secured in its relative position with respect to the coupling link 86 in that the control element 80 is arranged in portion X of the control slot 82 now, such that a drive torque is introduced into the main pillar 28 and said main pillar is pivoted towards the rear, via the drive link 74 which is articulated to the outer side of the drive wheel 24, via the control link 78 which is situated in an extended position with the drive link 74 then, via the coupling link 86 and via the link 90. By continuing to rotate the drive wheel 24 in the same direction, the linkage 12 is consequently stored in the top storage compartment, wherein the control element 80 of the control link 78 is then arranged in an end region of region X of the control slot 82, the end region facing away from region Y. The links are prevented from breaking free from the extended position through the engagement of the control element 80 in region X of the control slot 82.

The roof 10 is displaced from the storage position into the closed position spanning the vehicle interior in a manner which is correspondingly inverted.

The invention claimed is:

1. A top of a convertible vehicle, said top comprising:
   a linkage movable between a closed position spanning a vehicle interior and a storage position uncovering the vehicle interior to the top and which, in relation to a vertical longitudinal center plane of the top has opposing sides;
   a linkage arrangement on said sides of the linkage and pivotably mounted at a rear main bearing, said linkage arrangement including a first pivot component and a second pivot component;
   a rotatable drive wheel coupled to the pivot components, wherein, when the drive wheel is rotated, the first pivot component is always subjected to a drive torque, and the second pivot component, as a function of the position of a control element in a control slot that is fixed relative to the main bearing, is either held in place or is subjected to a drive torque, wherein the control element is a control link pivotably connected to a coupling link having a pivot axis coaxial with an axis of rotation of the drive wheel.

2. The top of a convertible vehicle according to claim 1, wherein the control link is connected to the drive wheel via a drive link.

3. The top of a convertible vehicle according to claim 2, wherein the control link includes a first leg and a second leg, the control element being disposed at a free end of the first leg, and the drive link is linked to the second leg.

4. The top of a convertible vehicle according to claim 3, wherein the first and second legs of the control link span an acute angle.

5. The top of a convertible vehicle according to claim 2, wherein the control slot includes a first slot portion that runs concentrically to a periphery of the drive wheel and a second slot portion that has an opposite-direction curved profile with respect to the first slot portion, such that when the control element is arranged in the first slot portion, the drive torque is introduced into the second pivot component from the drive wheel via the drive link, the control link and the coupling link, and, when the control element is arranged in the second slot portion, the second pivot component is stopped when the drive wheel is driven.

6. The top of a convertible vehicle according to claim 1, wherein the drive wheel is a gear wheel, the first pivot component being linked to a side of the gear wheel that faces the vertical longitudinal center plane of the top and the second pivot component being coupled to a side of the gear wheel that faces away from the vertical longitudinal center plane of the top.

7. The top of a convertible vehicle according to claim 6, wherein the first pivot component is linked via a reduction gearing formed from a link arrangement.

8. The top of a convertible vehicle according to claim 1, wherein the first pivot component is a rear tensioning bracket of a foldable top, which bracket is connected to a tensioning rod arrangement to which the drive wheel is linked.

9. The top of a convertible vehicle according to claim 1, wherein the second pivot component is a main link of the respective linkage arrangement, the main link being pivotably mounted at the main bearing.

10. The top of a convertible vehicle according to claim 1, including a drive motor driving the driving wheel.

11. A top of a convertible vehicle, said top comprising:
a linkage movable between a closed position spanning a vehicle interior and a storage position uncovering the vehicle interior to the top and which, in relation to a vertical longitudinal center plane of the top has opposing sides;
a linkage arrangement on said sides of the linkage and pivotably mounted at a rear main bearing, said linkage arrangement including a first pivot component and a second pivot component;
rotatable drive wheel coupled to the pivot components, wherein, when the drive wheel is rotated, the first pivot component is always subjected to a drive torque, and the second pivot component, as a function of the position of a control element in a control slot that is fixed relative to the main bearing, is either held in place or is subjected to a drive torque, wherein, when displacing the linkage from the closed position into the storage position and when displacing the linkage from the storage position into the closed position, in each case, the drive wheel is driven only in one direction of rotation.

* * * * *